(12) United States Patent
Linder et al.

(10) Patent No.: US 7,843,213 B1
(45) Date of Patent: Nov. 30, 2010

(54) SIGNAL TERMINATION SCHEME FOR HIGH SPEED MEMORY MODULES

(75) Inventors: Peter Linder, Sugar Land, TX (US); Jeffrey Eldon Johnson, Houston, TX (US); James Sanford Wallace, Sugar Land, TX (US)

(73) Assignee: Nanya Technology Corp., Kueishan, Tao-Yuan Hsien (TW)

( * ) Notice: Subject to any disclaimer, the term of this patent is extended or adjusted under 35 U.S.C. 154(b) by 0 days.

(21) Appl. No.: 12/469,694

(22) Filed: May 21, 2009

(51) Int. Cl.
*H03K 17/16* (2006.01)
*H03K 19/003* (2006.01)

(52) U.S. Cl. .............. 326/30; 326/32; 326/33

(58) Field of Classification Search ........ None
See application file for complete search history.

(56) References Cited

U.S. PATENT DOCUMENTS 6,356,106 B1   3/2002   Greeff et al.
2003/0126338 A1*  7/2003  Dodd et al. ............. 710/305
2010/0030934 A1*  2/2010  Bruennert et al. ........ 710/104

* cited by examiner

Primary Examiner—Anh Q Tran
(74) Attorney, Agent, or Firm—Winston Hsu; Scott Margo

(57) ABSTRACT

A memory device is coupled to a subset of lines of a data input/output (I/O) bus. The memory device includes an on-die active termination circuit for terminating the subset of lines of the data I/O bus with a selected impedance being one of a plurality of selectable impedances; a termination value register being coupled to the on-die active termination circuit for storing a value representing the selected impedance; and a termination value setting circuit being coupled to the termination value register, for setting the value representing the selected impedance in the termination value register.

18 Claims, 4 Drawing Sheets

SIGNAL TERMINATION SCHEME FOR HIGH SPEED MEMORY MODULES

BACKGROUND OF THE INVENTION

1. Field of the Invention

The present invention relates to On Die Termination (ODT) in high speed memory modules, and in particular, to select different termination values on each memory chip in systems utilizing memory modules.

2. Description of the Prior Art

In a typical memory system, various memory locations, routing limitations, and signal paths of busses coupled to the individual memories cause timing skew and other signal quality issues. Some compensation may be needed by performing line termination.

FIG. 1 shows a typical fixed passive termination configuration 100 for a data bus according to the related art. The data bus can be modeled as a plurality of transmission line segments 120 as illustrated in FIG. 1. A memory controller 110 controls a plurality of memory devices 130 located along the data bus, and a passive termination resistor 140 is positioned at the end of a final transmission line segment 120 on the data bus to prevent signal reflections caused by standing waves or other phenomenon. Of note is that the passive termination resistor 140 is enabled at all times resulting in an inefficient use of power. Also, the passive termination resistor 140 cannot properly terminate the data bus in all conditions and signal quality of the lines on the data bus is therefore not optimal.

In an attempt to overcome the problems associated with the use of fixed passive terminations such as illustrated in FIG. 1, mode-selected On Die Termination (ODT) has been demonstrated in the related art. However, mode-selected ODT allows only a single termination value to be selected across all the devices on the data bus, which greatly limits the effectiveness. The reason effectiveness is limited is that each device is at a different physical position so signal lines routed on the circuit board will undergo different clock skews.

SUMMARY OF THE INVENTION

It is therefore one of the objectives of the present invention to provide an improved On Die Termination (ODT) having a unique termination value on each device.

According to one exemplary embodiment, a memory device is disclosed being coupled to a subset of lines of a data input/output (I/O) bus. The memory device comprises an on-die active termination circuit for terminating the subset of lines of the data I/O bus with a selected impedance being one of a plurality of selectable impedances; a termination value register being coupled to the on-die active termination circuit for storing a value representing the selected impedance; and a termination value setting circuit being coupled to the termination value register, for setting the value representing the selected impedance in the termination value register.

According to another exemplary embodiment, a method of terminating a transmission line from a memory device is disclosed. The memory device is coupled to a subset of lines of a data input/output (I/O) bus. The method comprises utilizing an on-die active termination circuit for terminating the subset of lines of the data I/O bus with a selected impedance being one of a plurality of selectable impedances; providing a termination value register for storing a value representing the selected impedance; and setting the value representing the selected impedance in the termination value register utilizing a termination value setting circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
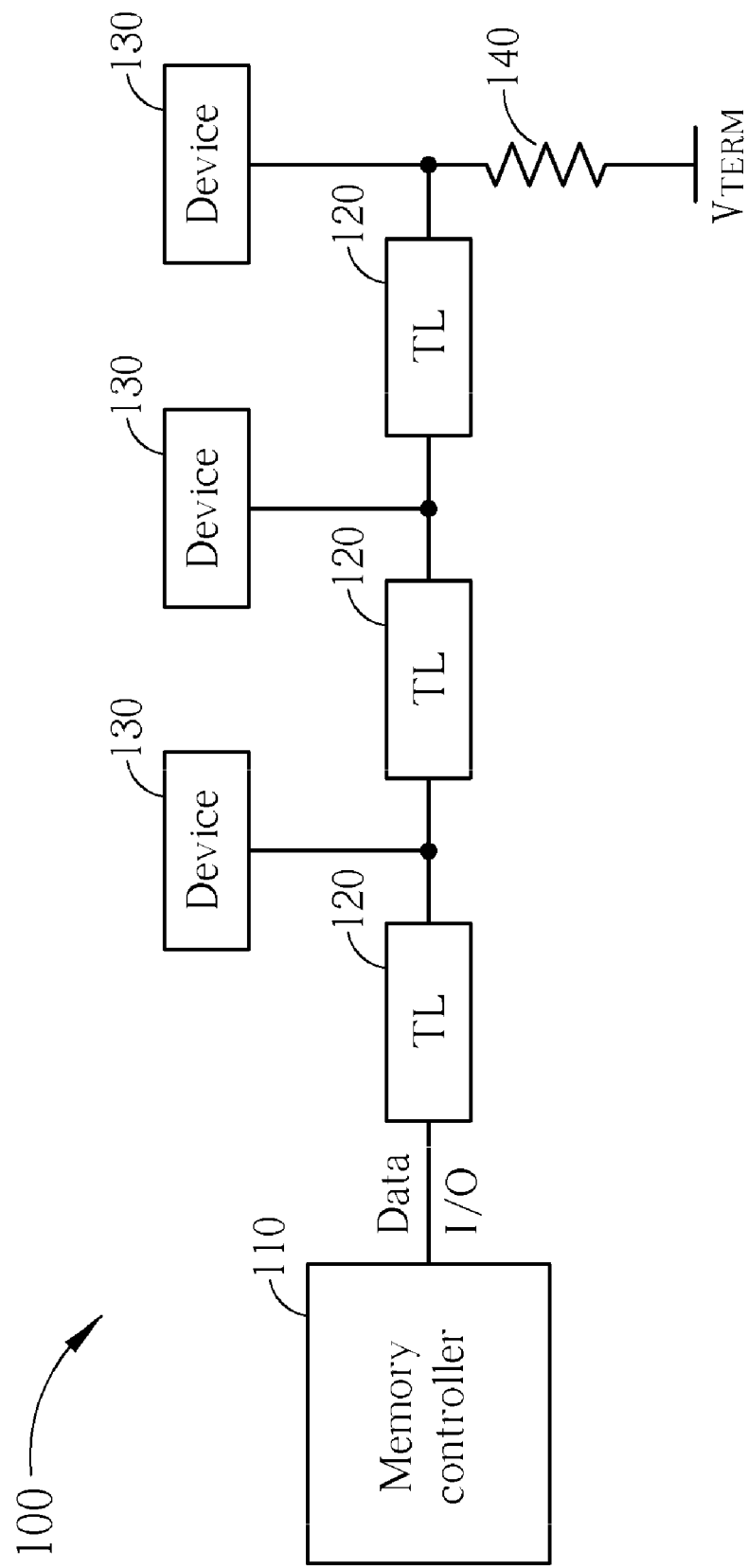
FIG. 1 illustrates a typical fixed passive termination configuration for a data bus according to the related art.
Figure 2:
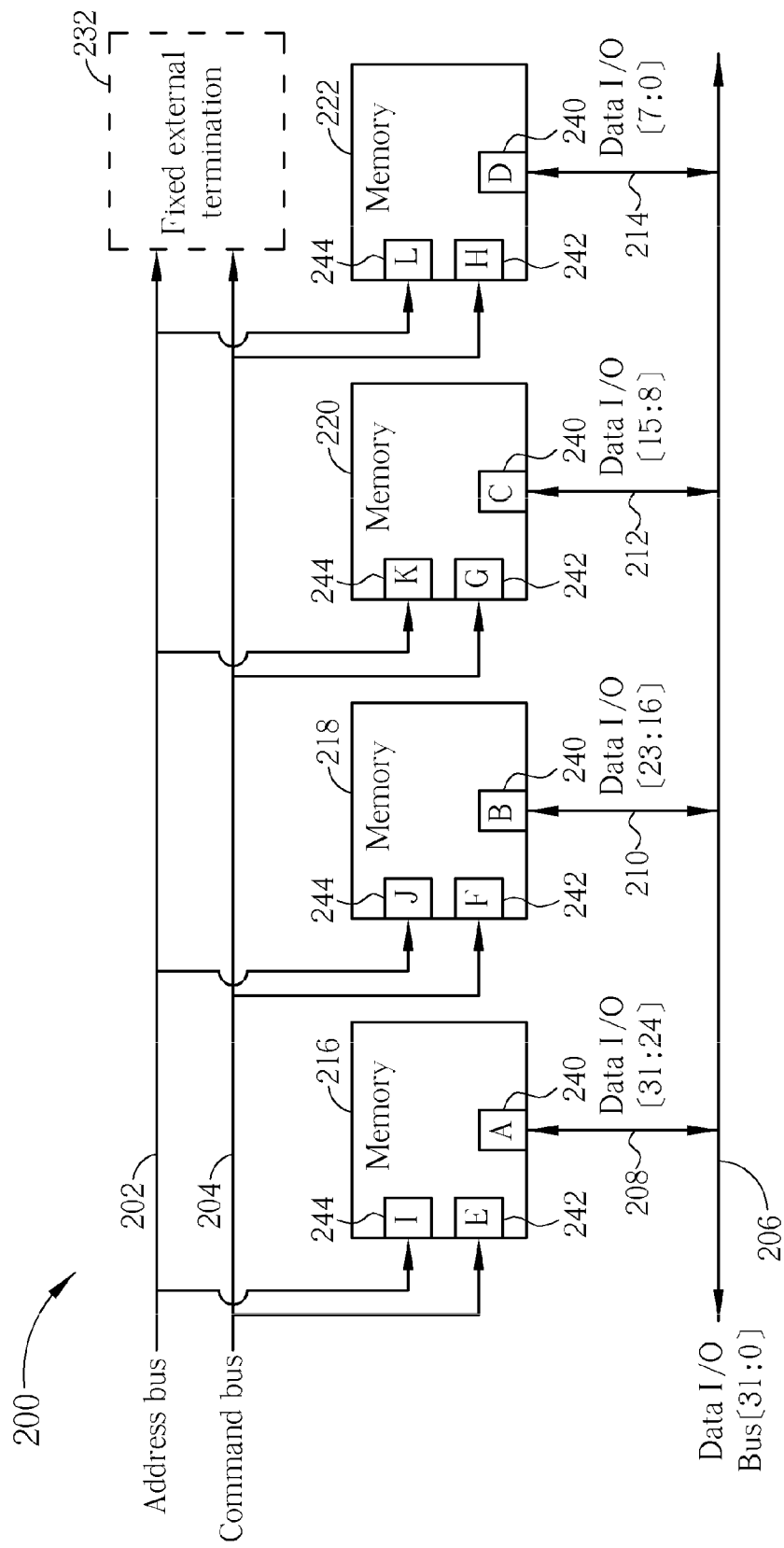
FIG. 2 illustrates an on-die active termination system according to an exemplary embodiment of the present invention.

FIG. 2 illustrates an on-die active termination system 200 according to an exemplary embodiment of the present invention. The system 200 includes a plurality of memory devices 216, 218, 220, 222 and an optional fixed external termination block 232. Each memory 216, 218, 220, 222 is coupled to an address bus 202, a command bus 204, and a unique subset of lines of a data bus 206. For exemplary purposes, a 32-bit data bus and 8-bit dynamic random access memories (DRAMS) 216, 218, 220, 222 are utilized in this embodiment; wherein the first memory 216 is coupled to the top four most significant data I/O bits [31:24], the second memory 218 is coupled to data I/O bits [23:16], the third memory 220 is coupled to data I/O bits [15:8], and the fourth memory 222 is coupled to the bottom least significant data I/O bits [7:0]. Of course, other types of memories and other memory word bit widths could be utilized in the system 200 such as static random access memories (SRAMS) or 4-bit memories to name but two examples. Also, the connections of the data I/O bus lines do not have to be sequentially arranged from MSB to LSB when connected to the particular memories.

In this embodiment, each memory 216, 218, 220, 222 includes a plurality of on-die active termination circuits 240, 242, 244 utilized for terminating various transmission lines such as the busses 202, 204, 206 that are coupled to the memories 216, 218, 220, 222. In particular, the first on-die active termination circuits 240 are utilized to terminate the unique subset of lines of the data I/O bus 206 that are coupled to each memory 216, 218, 220, 222. The second on-die active termination circuits 242 are utilized to terminate lines of the command bus 204, and the third on-die active termination circuits 202 are utilized to terminate lines of the address bus 202.

To optimize signal quality within the system 200, the particular impedances generated by the termination circuits 240, 242, 244 are individually set and may not be the same values as each other, or of those of other memories. In FIG. 2, the different letters A, B, C, D, E, F, G, H, I, J, K, L represent unique impedances being utilized to terminate the lines of the various buses 202, 204, 206. It is not a constraint of the present invention that the impedances must be unique; however, it is a feature that they may be unique and therefore different impedances for each termination circuit 240, 242, 244 are shown for exemplary purposes in FIG. 2.

Figure 3:
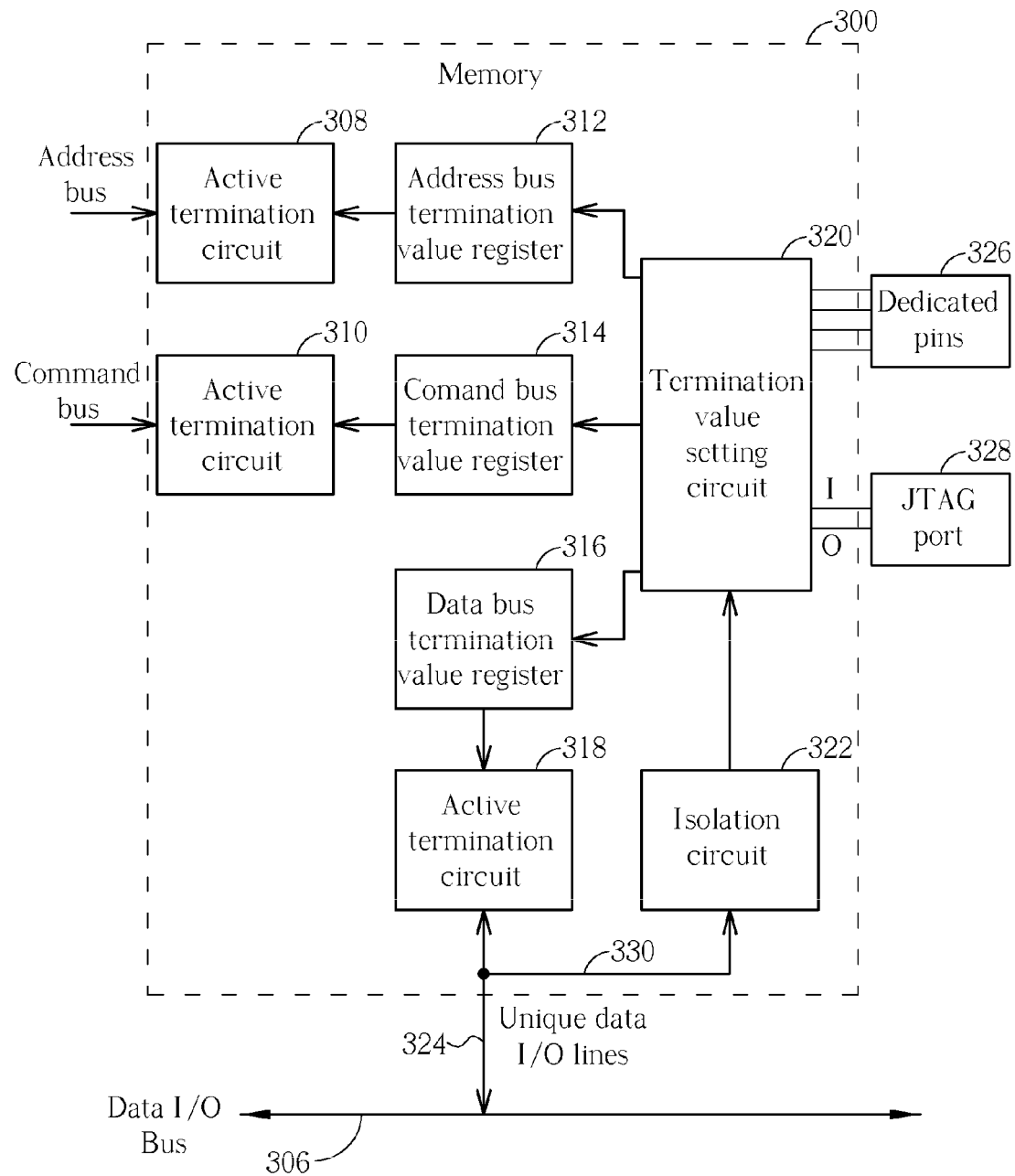
FIG. 3 illustrates a memory device of the system of FIG. 2 according to an exemplary embodiment of the present invention.

FIG. 3 illustrates a memory device 300 being coupled to an address bus 302, a command bus 304, and to a subset 324 of unique lines of a data I/O bus 306 according to an exemplary embodiment of the present invention. The memory includes three active termination circuits 318, 310, 308; three termination value registers 316, 314, 312; a termination value setting circuit 320, and an isolation circuit 322.

In order to configure the specific impedances to be generated by the three active termination circuits 318, 310, 308, the termination value setting circuit 320 is coupled to the unique data I/O lines 324 (this coupling is optionally made via the isolation circuit 322 as shown in FIG. 2, which will be explained later). In this embodiment, a memory controller (not shown) performs a Mode Register Set command to configure the memory 300, and the Mode Register Set command includes information specifying the impedances to be utilized by the active termination circuits 318, 310, 308. The termination value setting circuit 320 sets values representing the impedances specified within the Mode Register Set command into the appropriate termination value registers 316, 314, 312. In this embodiment, because the memory 300 has a word size of 8-bits (i.e., there are eight unique data I/O lines 324), a single Mode Register Set command may be sufficient to specify all three active termination impedances. In another embodiment, a series of Mode Register Set commands could be received in order to pass all the required information to allow the setting circuit 320 to appropriately set the termination values in the registers 316, 314, 312.

Once all the required information has been received from the data I/O bus, the isolation circuit may be activated in order to isolate the termination value setting circuit 320 from the unique data I/O lines 324 of the data I/O bus 306. The purpose of isolating the setting circuit 320 from the data I/O bus is to prevent the input impedance of the setting circuit 320 from interfering with the proper termination of the unique data I/O lines. Particularly for high speed memory modules, the data I/O bus is sensitive to capacitive loading, which is preferred to be as low as possible, and because extra control circuits on the bus such as the setting circuit 320 increase capacitances, there is a potential risk of unwanted capacitive loading. Therefore, in this embodiment, once the information has been received by the memory 300, the setting circuit 320 provides no further purpose and may be disabled and removed from the data I/O bus 306 via the isolation circuit 322.

In one embodiment, the isolation circuit 322 is implemented with a fuse that is blown after the information has been received by the setting circuit 320. Therefore, the termination values of the memory 300 are set one time in non-volatile registers 316, 314, 312 (e.g., at first operation during a final stage of manufacturing of a circuit board comprising the memory 300) and are then fixed for the life of the memory 300. An advantage of one-time programming the termination values is that termination mode is fixed, instead of needing to be loaded with a mechanism such as a Mode Register Set command each time the device is powered up. System boot-up speed is thereby increased.

In another embodiment, the isolation circuit 322 is implemented with a switch that may be dynamically opened and closed according to whether the termination values are to be reconfigured. In this way, the termination values can be changed at any time during the operation of the memory 300. Such a configuration could be beneficial for systems where memories may be changed (e.g., swapped in and out during expansion) thus requiring different termination schemes in order to maximize signal quality. This could be referred to as dynamic adaptable termination. Other situations that may benefit from dynamic adaptable termination include if any system operating mode has been changed, such as a frequency, voltage, operating temperature, interference requirements, error rates, transmission line characteristics of substrate, use of a different interposer, package, connector, motherboard, or similar parameters in the signal path, which may require signal quality enhancements.

In yet another embodiment, the isolation circuit 322 may not be required at all (i.e., because there is no significant signal degradation caused by the setting circuit 320 hanging on the lines of the bus 324) or may be integrated as a part of the setting circuit 320. It should be noted that if the isolation circuit 322 is included, a length of signal trace 330 may be minimized to thereby minimize signal line stubs and reduce unwanted reflections on the unique data I/O lines 324 after the setting circuit 320 is isolated from the data I/O bus 306.

To save system power, in another embodiment, the termination value selecting circuit 300 disables the active termination circuits 318, 310, 308 on every memory device 300 which is not being accessed by the external memory controller. The power savings is achieved in that no 'wasted' termination current is utilized, and because passive terminations, if used, are of smaller value. Power saving is also realized by using smaller output drivers on registers, controllers, and interface circuits which drive the address bus 302, command bus 304, and other control signals (not shown).

Figure 4:
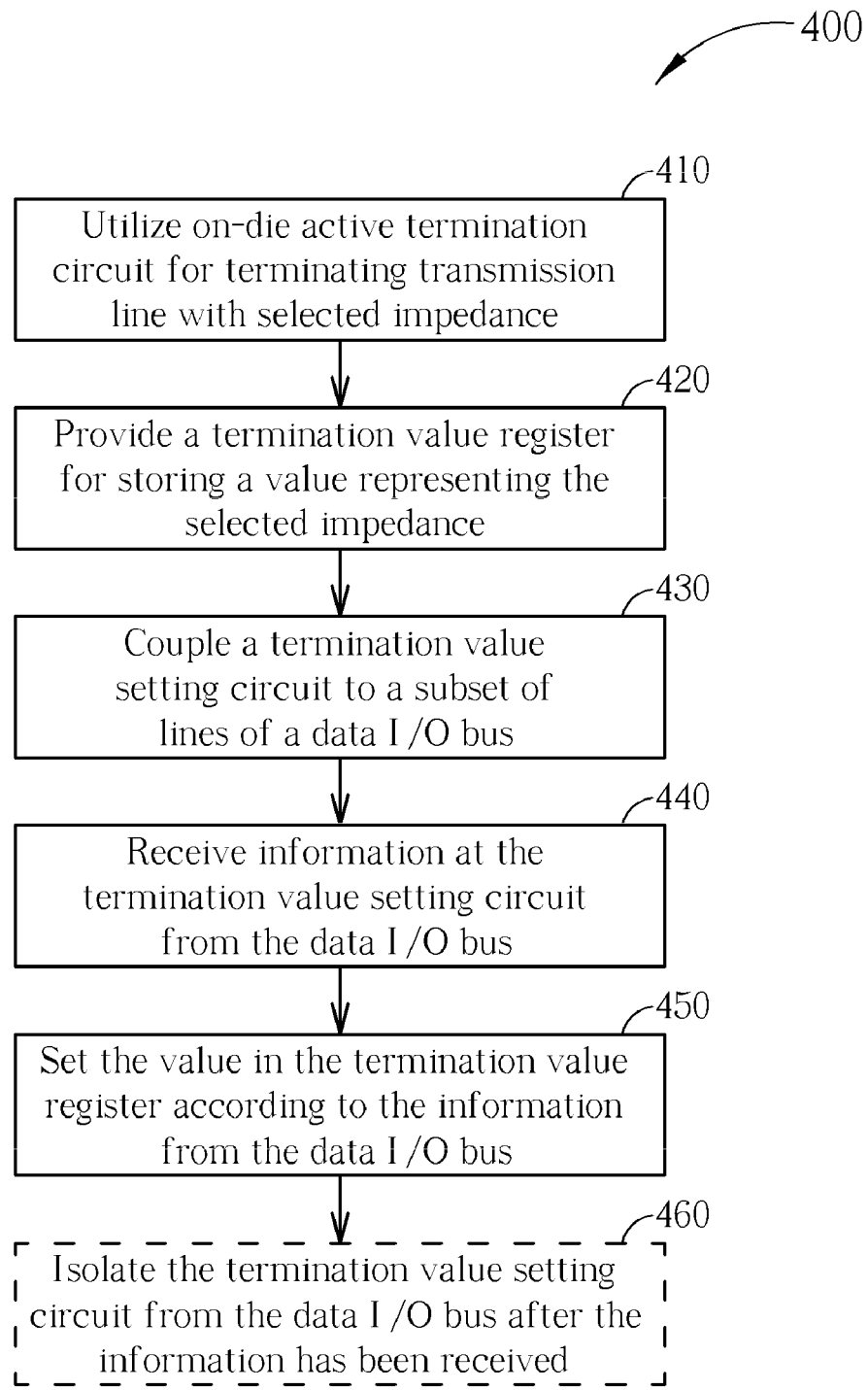
FIG. 4 illustrates a process of on-die active termination for a memory device according to an exemplary embodiment of the present invention.

FIG. 4 illustrates a process 400 of on-die active termination for a memory device according to an exemplary embodiment of the present invention. In one example, the memory device may be single memory device in a memory module having a plurality of similar memory devices. Provided that substantially the same result is achieved, the steps of the process 400 need not be in the exact order shown and need not be contiguous, that is, other steps can be intermediate. According to this embodiment, the process 400 includes the following steps:

Step 410: Utilize an on-die active termination circuit for terminating a transmission line connected to the memory device with a selected impedance. The selected impedance may be one of a plurality of selectable impedances, such as, in one embodiment, any value between 20 ohms to 200 ohms. The on-die active termination circuit may be implemented utilizing a variable feedback resistor that is set according to the selected termination value, for example. The transmission line may be any signal or group of signals that are connected to the memory device such as the unique lines of the data I/O bus connected to the memory device, the address bus, or the command bus.

Step 420: Provide a termination value register for storing the value representing the selected impedance. In some embodiments, the register may be a non-volatile register to allow the memory device to preserve the setting even when power is disconnected. In other embodiments, the value may be set in a temporary register as part of a boot-up sequence of a system incorporating the process.

Step 430: Couple a termination value setting circuit to a subset of lines of a data I/O bus. The data I/O bus may be the same bus that is utilized to access data in the memory module by a memory controller of the system incorporating the process. Because each memory device in the module is connected to a unique subset of the lines of the data I/O bus, the data transmitted on these lines will be unique to each memory device and it is thereby useful for specifying a unique impedance value for each memory.

Step 440: Receive information at the termination value setting circuit from the subset of lines of the data I/O bus corresponding to what impedance value to utilize for termination purposes. In one embodiment, the information could be contained in a Mode Register Set instruction received from an external memory controller.

Step 450: Set the impedance value in the termination value register according to the information from the data I/O bus. In this way, the transmission line will be terminated with the desired impedance value. Because each memory device is coupled to unique lines of the data I/O bus, each memory can have a different termination value. For example, to approximate an ideal terminator, the memory devices along the transmission line can have decreasing impedance values as the distance from the external memory controller increases. For fine grain control, set the termination on each memory device depending where on the PCB it is.

Step 460: Isolate the termination value setting circuit from the data I/O bus after the information has been received. Although this step is optional, particularly for low speed memory systems, for high speed memory systems it may be beneficial to remove the termination value setting circuit from the data I/O bus after the information specifying the termination value is received. The purpose of breaking the connection to the lines of the data I/O bus is to prevent the input impedance of the setting circuit from affecting the signal quality on the data I/O bus.

As described above, one embodiment of the present invention consists of a termination-by-location scheme to compensate for variance in transmission line signal path lengths, wherein each memory in the system has its termination impedance programmable via the data I/O bus. The capability of using the data (I/O) bus for selecting termination modes and values allows for the optimization of termination values, and reduces the power required for terminations.

As shown in FIG. 3, in another embodiment, dedicated pins 326, 328 are connected to the termination value setting circuit, and the termination value selecting circuit 320 sets the various termination values according to information received from the dedicated pins 326, 328. The information could be hardwired values set on the PCB according to a location of the memory device on the data I/O bus. The information could also describe where on the memory module the device is located or specify a specific termination value. In another embodiment, the memory devices of a memory module are daisy chained together using a JTAG port 328 or a similar mechanism. Such a configuration would allow the information to be cycled through the chain to each memory device.

Also, it should be noted that although the above described embodiments illustrate actively terminating the address bus 302, the command bus 304, and the data bus 324, this is for illustrative purposes only and, in fact, any transmission line or combination of transmission lines could be terminated according the present invention. For example, in one embodiment, only the data I/O bus is terminated according to the above process of the present invention, while the address bus and command bus instead utilize a fixed external termination device 232 such as the one shown in FIG. 2.

Those skilled in the art will readily observe that numerous modifications and alterations of the device and method may be made while retaining the teachings of the invention.

What is claimed is:

1. A memory device coupled to a subset of lines of a data input/output (I/O) bus, the memory device comprising:
    an on-die active termination circuit for terminating the subset of lines of the data I/O bus with a selected impedance being one of a plurality of selectable impedances;
    a termination value register coupled to the on-die active termination circuit for storing a value representing the selected impedance; and
    a termination value setting circuit coupled to the termination value register and the subset of lines of the data I/O bus, for setting the value representing the selected impedance in the termination value register in response to information received from the data I/O bus.

2. The memory device of claim 1, wherein the information received from the data I/O bus is passed via a Mode Register Set command received from an external memory controller.

3. The memory device of claim 1, further comprising an isolation circuit positioned between the subset of lines of the data I/O bus and the termination value setting circuit for isolating the termination value setting circuit from the subset of lines of the data I/O bus after the information has been received.

4. The memory device of claim 1, further comprising:
    a second on-die active termination circuit for terminating lines of a second bus coupled to the memory device with a second selected impedance being one of a plurality of second selectable impedances; and
    a second termination value register coupled to the second on-die active termination circuit for storing a value representing the second selected impedance;
    wherein the termination value setting circuit is for setting the value representing the second selected impedance in the second termination value register in response to the information received from the data I/O bus.

5. The memory device of claim 4, wherein the second bus is an address bus for passing address locations to the memory device.

6. The memory device of claim 5, wherein the second bus is a command bus for passing commands to the memory device.

7. The memory device of claim 1, further comprising dedicated pins connected to the termination value setting circuit; wherein the termination value setting circuit is for setting the value representing the selected impedance in the termination value register in response to information received from the dedicated pins.

8. The memory device of claim 7, wherein the information received from the dedicated pins corresponds to hardwired values set in response to a location of the memory device on the data I/O bus.

9. The memory device of claim 1, wherein the termination value setting circuit is further for disabling the on-die active termination circuit when the memory is blocked from access by an external memory controller.

10. A method of terminating a transmission line from a memory device which is coupled to a subset of lines of a data input/output (I/O) bus, the method comprising:
    utilizing an on-die active termination circuit for terminating the subset of lines of the data I/O bus with a selected impedance being one of a plurality of selectable impedances;
    providing a termination value register for storing a value representing the selected impedance; and
    setting the value representing the selected impedance in the termination value register utilizing a termination value setting circuit;
    wherein the termination value setting circuit is coupled to the subset of lines of the data I/O bus, and the value representing the selected impedance in the termination value register is set in response to information received from the data I/O bus.

11. The method of claim 10, wherein the information received from the transmission line is passed via a Mode Register Set command received from an external memory controller.

12. The method of claim 10, further comprising isolating the termination value setting circuit from the subset of lines of the data I/O bus after the information has been received utilizing an isolation circuit positioned between the subset of lines of the data I/O bus and the termination value setting circuit.

13. The method of claim 10, further comprising:
utilizing a second on-die active termination circuit for terminating lines of a second bus being coupled to the memory device with a second selected impedance being one of a plurality of second selectable impedances;
providing a second termination value register for storing a value representing the second selected impedance; and
setting the value representing the second selected impedance in the second termination value register in response to the information received from the data I/O bus utilizing the termination value setting circuit.

14. The method of claim 13, wherein the second bus is an address bus for passing address locations to the memory device.

15. The method of claim 13, wherein the second bus is a command bus for passing commands to the memory device.

16. The method of claim 10, further comprising:
providing dedicated pins being connected to the termination value setting circuit; and
setting the value representing the selected impedance in the termination value register in response to information received from the dedicated pins utilizing the termination value setting circuit.

17. The method of claim 16, wherein the information received from the dedicated pins corresponds to hardwired values set in response to a location of the memory device on the data I/O bus.

18. The method of claim 10, further comprising disabling the on-die active termination circuit when the memory is blocked from access by an external memory controller.

* * * * *